(12) United States Patent
Benedek et al.

(10) Patent No.: US 12,092,362 B2
(45) Date of Patent: Sep. 17, 2024

(54) METHOD AND APPARATUS FOR AIR TREATMENT EMPLOYING CATALYST MATERIAL

(71) Applicant: Bluezone IP Holding LLC, Woburn, MA (US)

(72) Inventors: Karen Benedek, Winchester, MA (US); Philip C. Carbone, North Reading, MA (US); Peter J. Loftus, Cambridge, MA (US); Anna Cheimets, Somerville, MA (US); Cody O'Sullivan, Somerville, MA (US); David Hensel, Boston, MA (US)

(73) Assignee: Bluezone IP Holding LLC, Woburn, MA (US)

( * ) Notice: Subject to any disclaimer, the term of this patent is extended or adjusted under 35 U.S.C. 154(b) by 304 days.

(21) Appl. No.: 17/070,196

(22) Filed: Oct. 14, 2020

(65) Prior Publication Data

US 2021/0108810 A1 Apr. 15, 2021

Related U.S. Application Data

(60) Provisional application No. 62/914,774, filed on Oct. 14, 2019.

(51) Int. Cl.
*F24F 3/16* (2021.01)
*F24F 8/10* (2021.01)
F24F 8/167 (2021.01)

(52) U.S. Cl.
CPC ............ *F24F 8/10* (2021.01); *F24F 8/167* (2021.01); *F24F 2221/34* (2013.01)

(58) Field of Classification Search
CPC .......... F24F 8/10; F24F 8/167; F24F 2221/34; F24F 2221/42; F24F 2221/46;
(Continued)

(56) References Cited

U.S. PATENT DOCUMENTS 5,447,693 A 9/1995 Ohta et al.
2018/0283707 A1* 10/2018 Scheja ............... B01D 53/0438

FOREIGN PATENT DOCUMENTS

JP H10337436 A * 12/1998
JP H11-287469 A 10/1999
(Continued)

OTHER PUBLICATIONS

International Search Report and Written Opinion for International Application No. PCT/US2020/055538 mailed Apr. 1, 2021.
(Continued)

*Primary Examiner* — Xiuyu Tai
(74) *Attorney, Agent, or Firm* — Wolf, Greenfield & Sacks, P.C.

(57) ABSTRACT

An apparatus and method for treating air. A housing can enclose a heating zone and an oxidizing zone positioned downstream of the heating zone with respect to a flow direction of the air being treated. A catalyst in the oxidizing zone oxidizes contaminants from the air, and an air mover positioned is configured to move air from an air inlet through the housing to an air outlet. An air treatment cycle can include an air cleaning mode at a high air flow and a self-cleaning mode at a lower air flow. A heater is operated during the self cleaning mode to oxidize contaminants that on the catalyst from the air cleaning mode.

17 Claims, 7 Drawing Sheets

(58) Field of Classification Search
CPC .............. F24F 2221/22; F24F 2110/52; F24F 2110/60; F24F 2110/62; F24F 2110/64; F24F 2110/65; F24F 2110/30; F24F 13/085; F24F 2013/088; F24F 13/081; F24F 13/06; F24F 11/65; F24F 11/30; F24F 11/39; F24F 2110/50; B01J 35/633; B01J 35/635; B01J 37/0221; B01J 35/638; B01J 35/617; B01J 35/615; B01J 23/8892; B01J 23/72; B01J 35/613; B01J 35/56; B01J 23/02; B01J 35/618; B01J 23/24; B01J 23/20; B01J 23/14; B01J 35/23; B01D 53/8675; B01D 53/8687; B01D 53/885; B01D 46/0052; B01D 53/864; B01D 2279/40; B01D 2259/4558; B01D 2257/502; B01D 2257/30; B01D 2259/4575; B01D 2257/2064; B01D 2258/06; B01D 2255/2073; B01D 2259/4566; B01D 2259/4508; B01D 2257/708; B01D 2255/9207; B01D 2255/207; B01D 2255/20761; B01D 2257/306; B01D 2257/402; B01D 2257/504; B01D 53/0438; B01D 53/30; B01D 2259/40088; B01D 53/0454; B60H 3/0658; Y02A 50/20; Y02C 20/10
See application file for complete search history.

(56) References Cited

FOREIGN PATENT DOCUMENTS

| JP | 2000-015037 A | | 1/2000 |
|----|---------------|---|--------|
| JP | 2000015037 | * | 1/2000 |
| JP | 2000-350911 A | | 12/2000 |
| JP | 2000350910 A | * | 12/2000 |

OTHER PUBLICATIONS

PCT/US2020/055538, Apr. 1, 2021, International Search Report and Written Opinion.
PCT/US2020/055538, Apr. 28, 2022, International Preliminary Report on Patentability.
International Preliminary Report on Patentability for International Application No. PCT/US2020/055538, mailed Apr. 28, 2022.

* cited by examiner

METHOD AND APPARATUS FOR AIR TREATMENT EMPLOYING CATALYST MATERIAL

BACKGROUND

1. Field of Invention

This invention relates to cleaning air, such as air cleaning systems that treat air by removing one or more impurities from the air.

2. Related Art

Residential, commercial, industrial, and/or automotive spaces can have atmospheres that are contaminated with odors, gases, volatile organic compounds, grease, microbes or volatile inorganic compounds that cause discomfort or health hazards, for example, to people occupying those spaces. Conventional air cleaning technologies filter the air with materials that trap or otherwise adsorb or absorb gases, odors, or aerosols. These trapped or otherwise held contaminants are present in the filters and can be re-emitted into the atmosphere. For example, activated carbon is typically used to capture odors and/or volatile compounds from the air, and it is well known that activated carbon captures more contaminants when the contaminant concentration is high. However, when the contaminant concentration decreases, adsorbed gases begin to desorb from the activated carbon and are released back into the air.

SUMMARY OF INVENTION

In one aspect, the subject matter disclosed herein relates to methods or assemblies for treating air to remove impurities. Such impurity removal may involve one or more of a treatment to sanitize, filter, decontaminate, deodorize, purify, condition, heat, humidify, and/or dry an atmosphere, for example. Such methods and assemblies may employ a particulate filter to remove aerosols and particulate matter, a low temperature oxidizing catalyst to convert chemical compounds in the air into less harmful or less odorous constituents, a heater to provide heat to the catalyst to oxidize residual contaminants at a higher temperature, a fan or other air mover to draw air through the system, a sensor to detect one or more temperatures, air flow rate and/or other conditions, and a controller to control components such as the heater and/or air mover based on the inputs from sensed conditions or other operational parameters. In one aspect of the invention, the materials, apparatuses and assemblies are integrated into an air cleaning product or apparatus that is built into a ventilation hood in order to better manage grease and odors that are created from the cooking process. In another aspect of the invention, the air cleaning product or apparatus is integrated into and/or within an automobile where it is connected electronically to the remote starter, automobile cabin temperature sensor, and/or air conditioning system to remove VOCs that evolve from the cabin materials.

One preferred air cleaning approach involves converting odors, gases and/or other contaminants into harmless compounds that are not noticed by or cause harm to occupants in the room. There is also a need to ensure that the contaminants that are converted by the system are fully oxidized and do not produce significant secondary contaminants. It is also desirable to have an air treatment apparatus that offers a self-clean cycle that deodorizes, oxidizes or otherwise cleans its internal components of or from captured contaminants that cause odors or that could decrease the performance of the components, e.g., a catalyst is periodically refreshed so that its performance is maintained over time.

In some embodiments, a method for treating air includes moving air along an air flow path of a housing of an air treatment apparatus from an air inlet to an air outlet, shielding a heating element from air moving along the air flow path using a radiation shield arranged to direct radiated heat in a downstream direction along the air flow path, and adsorbing and/or oxidizing contaminants in the air at one or more catalyst layers downstream of the heating element. Shielding the heating element from air flow can help improve heating of the heating element and thereby improve heating of catalyst layers, e.g., by increasing heat radiated by the heating element. The shield can also function to radiate heat emitted by the heating element toward the catalyst layers as needed. For example, a heating element may emit heat in a direction away from the catalyst layers, and the radiation shield can direct that radiated heat toward the catalyst layers. In one case, an air treatment mode includes moving air along the air flow path at a first flow rate, shielding the heating element from air while the heating element is deactivated, and adsorbing and oxidizing contaminants at ambient temperature at the catalyst layer(s). In one case, a self-cleaning mode includes moving air along the air flow path at a second flow rate that is lower than the first flow rate, shielding the heating element from air while the heating element is activated and radiating heat, and desorbing and oxidizing contaminants at a second temperature higher than ambient temperature. In some embodiments, the second temperature is between 300 and 400 degrees F., and the self-cleaning mode can include radiating heat emitted by the heating element from the radiation shield in a downstream direction to the one or more catalyst layers. A plurality of catalyst layers can be employed and heating of the plurality of catalyst layers can be done sequentially from upstream to downstream such that the first upstream catalyst layer is elevated in temperature before the second downstream catalyst layer. In some cases, a temperature gradient may be present across the catalyst layers such that upstream catalyst layers operate at a higher temperature than downstream layers. This arrangement can help downstream layers treat contaminants released by upstream layers, e.g., because contaminants may be released more readily from a catalyst layer at higher temperatures. For example, adsorbing and/or oxidizing contaminants can include releasing contaminants from the first upstream catalyst layer (which is operating at a first higher temperature) and oxidizing the released contaminants at the second downstream catalyst layer (which is operating at a second lower temperature).

In some embodiments, an air treatment apparatus includes a housing having an air inlet, an air outlet, and an air mover arranged to move air along an air flow path in the housing from the air inlet to the air outlet. A plurality of catalyst layers may be arranged in the air flow path such that air moves along the air flow path from a first catalyst layer to a second catalyst layer downstream of the first catalyst layer. Each of the catalyst layers can extend across the air flow path and be arranged to adsorb and oxidize contaminants, e.g., at room or ambient temperatures. A heater including a heating element can be positioned along the air flow path upstream of the plurality of catalyst layers, and a radiation shield can be positioned along the air flow path upstream of the heating element. The radiation shield can be arranged such that air flows around the radiation shield and toward the plurality of catalyst layers, and so that the radiation shield directs radiated heat from the heating element toward the plurality of catalyst layers. For example, the radiation shield can reflect radiant energy emitted by the heater toward the catalyst layers.

In some embodiments, the radiation shield and the heating element are arranged such that the heating element is shielded by the radiation shield from air moving along the air flow path. By shielding the heating element from air flow and directing heat radiated by the heating element toward the catalyst layers, the radiation shield can help improve heating of the catalyst layers, which can be spaced from the heating element. In some cases, the heating element is arranged to radiate heat toward the plurality of catalyst layers, e.g., directly from the heating element to the catalyst layers, and/or in directions away from the catalyst layers. The radiation shield can have a concave shape that defines a concave space in which the heating element is positioned and that faces the plurality of catalyst layers. Positioning the heating element in the concave space can help shield the heating element from air flow and enhance the directing of radiant energy, e.g., reflection of infrared radiation, by the radiation shield toward the catalyst layers. In some cases, the radiation shield can have upper and lower panels each having an upstream edge and a downstream edge. The upstream edges of the upper and lower panels can be adjacent each other and the downstream edges of the upper and lower panels can be spaced apart, e.g., to define a V-shaped cavity in which the heating element is positioned and which faces the catalyst layers.

In some embodiments, the heating element has an elongated rod shape with a longitudinal axis extending transverse to the air flow path. The radiation shield can include an upper panel that extends along the longitudinal axis above the heating element, and a lower panel that extends along the longitudinal axis below the heating element. The upper and lower panels can have upstream edges that are adjacent each other and downstream edges that are spaced apart so as to define a concave shape in which the heating element is positioned. The upper and lower panels can be arranged such that air moving along the air flow path is directed over the upper panel and below the lower panel.

In some embodiments, a controller is arranged to control operation of the air mover and the heater to operate in an air cleaning mode and a self-cleaning mode. The air cleaning mode includes operation of the air mover to move air along the air flow path at a first flow rate and deactivation of the heater, i.e., so the catalyst layers operate to adsorb and oxidize contaminants at room or ambient temperature. The self-cleaning mode includes operation of the air mover to move air along the air flow path at a second flow rate that is lower than the first flow rate and activation of the heater to radiate heat toward the plurality of catalyst layers. In some cases, the catalyst layers are between 300 to 400 degrees F. during the self-cleaning mode. The controller can be controlled to heat the plurality of catalyst layers sequentially from upstream to downstream such that the first catalyst layer is elevated in temperature before the second catalyst layer. This arrangement may establish a temperature gradient across the catalyst layers from upstream to downstream.

There are a number of applications for air cleaning wherein the need to clean the air is periodic rather than continuous. In a residential kitchen, for example, cooking appliances are used for periods around mealtimes but are unused for much of the day or night. In this case, an air cleaner may operate while the odors are being generated or after the period of active cooking. An air cleaner may have different modes that operate at different times, for example, to remove contaminants from the air and oxidize the contaminants at a low temperature on the surface of a catalyst in one mode and oxidize any residual contaminants at a higher temperature in a second mode. A third mode could include driving off any final residual contaminants that resist low or higher temperature oxidation. This third mode could be accomplished when a ventilation source is exhausting air to the outside atmosphere.

There is a need for an air cleaning system that cleans cooking odors from a room such as a kitchen or combined kitchen and/or dining room. This cooking odor removal system could beneficially be configured as a built-in appliance that has a set operating cycle tied to the operation of the cooktop and the ventilation hood. With a built-in system, the air cleaner could be connected electronically to the cooktop and the ventilation hood such that the ventilation hood operates when the cooktop is powered or energized. When cooking is over or complete and the cooktop power is shut off, the ventilation hood fan that exhausts air outside could be shut down and the air cleaner could be turned on. The air cleaner could then begin an air cleaning cycle that recirculates the air through the room, reducing the energy loss associated with venting air to out of doors. The recirculated air cleaning system can remove residual odors and/or aerosols of grease or oils, for example, in the air in the kitchen. This air cleaning cycle could be customized based on the size of the kitchen, for example. This cleaning cycle could include the modes of adsorbing odors and other contaminants on the surface of a catalyst at one flow rate, oxidizing the odors and other contaminants at the same or a different flow rate, oxidizing the odors and contaminants at a higher temperature and a flow rate lower than the first flow rate and a final regeneration step that could be timed to occur when the ventilation hood is operating and venting the air to the outside atmosphere.

There is a need for an air cleaning system that could be built into an automobile and operated in conjunction with other automobile systems or characteristics, such as the internal temperature or the operation of the air conditioning system. An air cleaner built into an automobile could be activated by the remote starting fob, and/or mobile telephone, for example, so that the air begins to be cleaned before the occupant enters the car. An air cleaning system built into a car could be activated when the temperature in the car exceeds a threshold that could lead to excessive generation of VOCs from the materials in the cabin. This automobile air cleaning system could be activated or deactivated as appropriate when the air conditioning and ventilation system of the car are operating.

Also provided are a method and device to oxidize volatile gaseous compounds, odors, and/or molecular contaminants that remain on the catalyst surface by applying heat to the air at a relatively low flow rate. The heated air is passed through the oxidizing catalyst to further oxidize or completely mineralize the transformed chemicals.

Also provided is a cycle of operation that matches the air cleaning and self-cleaning/regeneration modes of the air cleaning device to the conditions of the environment to be cleaned, whether a kitchen, for example, or an automobile.

In some embodiments, an apparatus for treating air that includes a housing with an air inlet and an air outlet. The housing encloses an air treatment zone and heating zone. A first catalyst layer extends across the air treatment zone and includes a first catalyst material. A second catalyst layer is spaced apart from the first catalyst layer. The second catalyst layer may include a catalyst material that is the same as the first catalyst layer or it may include a second catalyst material that is different from the first catalyst material, such as where the first catalyst material oxidizes organic and/or inorganic compounds, and the second catalyst material removes ozone. Or, the first catalyst layer may contain a material that has a relatively high surface area and can adsorb chemicals and hold them for the time necessary for the chemicals to be oxidized by the adjacent active catalytic material. The chemicals can be desorbed over time from the first layer to be treated by the second layer of catalyst.

The downstream application can assist in increasing an oxidation rate of the chemical contaminants throughout a layer of the first catalyst material. The method can further include altering a rate at which the chemical contaminants enter a layer of the first catalyst material via a layer of adsorbent material upstream of the layer of the first catalyst material.

In some embodiments, steps and configurations for cleaning the catalyst material are provided by exposing the first catalyst material to heated air at a flow rate lower than normally used in an air treatment mode, wherein the cleaning oxidizes chemicals that have been adsorbed on the first catalyst material and require a higher temperature to fully oxidize. A predetermined operating cycle can be established including an air treatment mode and a self-cleaning mode, wherein the operating cycle comprises a first air treatment time at a first flow rate and a second self-clean time at a reduced flow rate; and operating a heater during the self-cleaning mode.

Catalysts may be specifically formulated to oxidize contaminants at a room or ambient temperature. A room temperature or relatively low temperature catalyst is one that is formulated to perform at temperatures between about 0° and about 40° C. Alternatively, a heater in the system could be used in conjunction with a catalyst formulated to operate at elevated temperatures. The elevated temperatures may be between about 150 degrees C. and about 200 degrees C., for example. A catalyst system can be designed to adsorb contaminants such as hydrocarbons, aldehydes, amines, alcohols or other compounds at one rate; and the second catalyst designed to oxidize contaminants at a second temperature.

In some embodiments, in the apparatus for treating air, the device includes a first catalyst section hosting the catalyst. In some embodiments of the section holding the catalysts, the catalyst section comprises a set of catalyst sheets or layers separated by spacers. These sheets of catalysts may be in or applied to the geometry of an expanded metal, a honeycomb, a corrugated sheet, a ceramic corrugated structure, an extruded ceramic structure, a porous foam and/or other volume with a relatively high surface area that allows air to flow through it. The spacers allow mixing of the air between the catalyst sheets, decreasing the chance that some contaminants in the air will travel through the catalyst section untreated. The spacers also can create a region of turbulence at the entrance section of each catalyst layer that enhances reaction rates in the channels of the catalyst.

In some embodiments, the catalysts may comprise active materials that oxidize chemical compounds at a room temperature. This catalyst may be made of manganese oxides, for example. In some embodiments of this invention, the catalyst comprises manganese dioxide wherein manganese dioxide is a general term and is intended to refer to and include different forms of manganese oxides, including but not limited to cryptomelane, Nsutite, pyrolusite, ramsdellite which is also referred to as alpha-$MnO_2$, beta-$MnO_2$ or R—$MnO_2$ or oxides of manganese with a molar ratio of oxygen to manganese of about 1 to about 3, for example.

The catalyst may be enhanced by including other elements, such as sodium, cerium, copper, or precious metals to provide higher conversion or more specific conversion of individual impurities, such as volatile organic compounds.

In some embodiments, the catalyst is designed to resist the adsorption of water into the active sites of the catalyst. The adsorption of water can decrease the effectiveness with which catalysts convert ozone to oxygen. Hydrophobic compounds such as siloxanes are or can be added to catalysts to resist the adsorption of water molecules. Alternatively, the pore structure can be altered to allow water to be desorbed from the catalyst material.

The cell density of the support structures can be between about 100 and about 1000 cells per square inch, with preferable performance of cell densities of the support structures between about 350 and about 900 cells per square inch. The catalytic activity of the manganese catalyst can be enhanced by positioning UV light to shine into the honeycomb structure. The enhancement of the reaction rate may result from increasing the energy level of an adsorbed gas molecules or from creating various reactive species that cause additional oxidation of the adsorbed VOCs. The catalytic activity of the manganese catalyst may be refreshed by adding heat before and between the layers of the oxidizing catalyst in order to maintain an active oxidizing atmosphere throughout the catalyst layers.

It is another object of the subject matter disclosed herein to trap and treat particulate matter and/or aerosols on and/or in a filter. This filter may be a high efficiency particle arresting (HEPA) filter or other particle capturing material that restricts the passage of particles or aerosols through the material. It is desirable to treat the particles on the filter so that the contaminants themselves do not degrade the performance of the filter. It is also desirable to treat the particles so that they are rendered inert and cannot cause harm if the particles come off the filter either in standard use or when replacing the filter. It is desirable to treat the particles on the filter so that they do not emit odors and/or toxic gases into the atmosphere while attached to and concentrated on the filter. It is desirable to treat any microbial particles so that the microbes cannot reproduce on the filter and sporulate or otherwise regenerate from the filter itself.

It is another object of the subject matter disclosed herein to trap and treat aerosols of grease or oil on a cleanable grease filter that is made of metal screen, expanded metal, and/or other water washable filter.

It is another object of the subject matter disclosed herein to provide a self-cleaning function that cleans the catalyst of adsorbed contaminants that have not been fully reacted and desorbed from the catalyst. This catalyst self-cleaning function is in some embodiments is provided by creating an air flow through the unit and operating the heater so that the catalyst will oxidize at least a portion of the contaminants on the catalyst that occupy active sites and would otherwise decrease the catalytic performance of the catalyst. When the catalyst is exposed to heat at a preferable temperature at a preferable space velocity, the adsorbed chemicals will oxidize and the reacted products will be desorbed from the catalyst. Space velocities for this function could be as low as about 10,000 hr-1 for example.

It is another object of the subject matter disclosed herein to clean the air, such as in or within an automobile. The assembly and method can be used to treat air in an automobile, where contaminants may be generated from the interior cabin materials of the car, i.e., VOC emissions from the plastics and glues and stabilizers and leather. Contaminants in the air of an automobile cabin may also come through the ventilation system or through the windows from outside the car where pollution levels may be relatively high. Pollutants outside a car may include particulate matter, ozone, carbon monoxide, soot, VOCs, and/or other chemicals.

Disclosed subject matter includes, in one aspect, an apparatus for treating air, which includes a housing with an air inlet and an air outlet, the housing enclosing an air treatment zone comprised of multiple elements that can be used in various combinations depending on the contaminants being cleaned from the air. The elements are designed in a way to be included or excluded from a product or apparatus assembly, making a modular air cleaning device that can be configured by the manufacturer to address one or more contaminants in a cost-effective manner. The modular elements include adsorbing layers, catalyst layers and heaters. The heaters may be located at the inlet to the adsorbing or catalyst layers or between these layers. The heaters could be operated in sequence to keep a total power consumption relatively low while applying heat to different sections of the air treatment zone.

In some embodiments the air treatment system includes a controller that can independently operate the multiple the heater or heaters, and/or the fan speed in order to create various modes of air cleaning or provide the self-cleaning function for the device.

In some embodiments, in the apparatus for treating air, the air mover comprises a volute and a fan, with the volute being connected to an upstream area of the fan.

In some embodiments, the apparatus for treating air further includes a material that can adsorb gases, at least temporarily. While adsorbing materials such as activated carbon and/or potassium permanganate, may not permanently hold the contaminants, they may adsorb and then desorb the gases at different rates, allowing the adsorber to change the rate at which the contaminants are released into the rest or remainder of the air treatment system. A layer of adsorbing material, such as activated carbon could be located upstream of a prefilter, downstream of the prefilter, upstream of an aerosol filter or downstream of the air filter, upstream of the catalyst bed or downstream of the first layer of catalyst in the catalyst bed.

In some embodiments, the apparatus for treating air further includes a user interface module configured to receive user input and present information to the user, and an electronic control module configured to set the apparatus to operate in one of a plurality of operation modes, wherein the plurality of operation modes include a regular operation mode, where the heater is off and the air mover operates at a first speed. In some embodiments, in the apparatus for treating air, the plurality of operation modes further includes a self-cleaning mode, where the heater is turned on and air mover operates in a second speed lower than the first speed.

In some embodiments, in the apparatus for treating air, the electronic control module is configured to set the apparatus to operate in one of a plurality of operation modes automatically based on at least one of output of at least one sensor and time.

In some embodiments, in the apparatus for treating air, the electronic control module is configured to set the apparatus to operate in one of a plurality of operation modes automatically based on at least one of an output of at least one other appliance and time. In some embodiments, in the apparatus for treating air, the at least one sensors is placed near the catalyst inlet, near the catalyst outlet, or both.

In some embodiments, in the apparatus for treating air, the at least one sensor detects an occupancy of an ambient environment where the apparatus is positioned or situated.

In some embodiments, in the apparatus for treating air, the at least one sensor detects a contaminant content and a level of an ambient environment where the apparatus is positioned or situated.

In some embodiments, in the apparatus for treating air, the electronic control module is configured to set the apparatus to operate in one of a plurality of operation modes based on the user input.

In some embodiments, the apparatus for treating air further includes a wireless communication module configured to communicate with a central management system.

In some embodiments, in the apparatus for treating air, the electronic control module sets the apparatus to operate in one of the plurality of operation modes based on instructions received from the central management system via the wireless communication module.

In some embodiments, in the apparatus for treating air, the instruction is at least partially based on information received from another appliance.

In some embodiments, in the apparatus for treating air, the instruction is at least partially based on information received from the system that the appliance is built into.

In some embodiments, the apparatus for treating air can be built into the kitchen cabinets and connected electronically to the range and the ventilation hood. The electronic control of the apparatus could be configured to operate a set operating cycle that includes a schedule of operating modes including cleaning air from the room, self-cleaning, and deodorizing the unit itself. The duration and elements of the cycle could be customized by the homeowner by providing the controller information about the size of the kitchen, for example. The timing of the cycle could be defined by the timing of the operation of the range, or other cooking appliance that could create food odors in the kitchen, and the operation of the ventilation hood, which generally operates when the range or cooktop is in operation. The air treatment apparatus could be configured to operate after the range has been used and the ventilation hood has been turned off. Residual odors in the room would then be removed in a set cleaning cycle. An example of an operating cycle is as follows: the air treatment system operates at high flow, for example about 100 to about 200 cfm with no heater operating in order to rapidly collect aerosols of grease or smoke from the room. After this aerosol cleaning period, the air flow could reduce to about 20 to about 150 cfm. After a cleaning cycle of approximately about 1-about 3 hours, corresponding to about 1 to about 15 air exchanges of the room, the air treatment system could reduce its flow rate to about 10 to about 30 cfm and turn the heater on in order to deodorize and oxidize the material collected on the grease filter and catalyst. This self-clean cycle could be maintained for about 0.5-about 3 hours. These cycle elements could be operated in any sequence depending on the nature of the air in the kitchen.

In some embodiments, the apparatus for treating the air can be built into or installed in an automobile. VOCs can be emitted by the interior plastics and fabrics in a relatively new car. This emission rate can be significantly increased when the car interior is heated, such as by the sun. Such VOC emissions can be controlled using a built in air treatment system that converts rather than captures these VOCs. Such an air cleaner can be built into the automobile and can be equipped with a variable speed fan to allow for the adjustment of air flow and hence the treatment rate of the air in the car cabin.

An example of an operating cycle in an automobile is that the air treatment system operates at high flow rate, for example about 10 to about 20 cfm in order to rapidly remove VOCs from the cabin air. The air cleaner may operate at this flow rate for the duration of an automobile trip. The air cleaner could be shut off when the automobile is shut off at the end of a trip. This could repeat multiple times until the air cleaner had operated for some total time, such as about 2 to about 4 hours cumulatively. After that amount of operating time, the air cleaner may be turned on at the start of an automobile trip and operate at lower flow rate, such as about 2-about 4 cfm with a heater energized to oxidize any contaminants remaining on the catalyst. This self-clean cycle may last about 10-about 20 minutes, or as long as it takes for the temperature exhausting the catalyst to reach about 300-about 350 F for a defined period of time, say about 2 to about 5 minutes.

In one embodiment, control of the air cleaner can be initiated via a mobile phone application. For example, if the car interior temperature exceeds a certain value, the air cleaner can be automatically operated. Furthermore, operating modes can be selected depending on the presence or absence of vehicle occupants. For example, relatively high airflow provides relatively higher treatment rates, but can be too noisy for certain vehicle occupants.

In one embodiment, a driver anticipates using the car at a certain time and via an app, starts the air cleaner some time (e.g., about 5-about 30 minutes) before entering the car. The air cleaner can remove the VOCs from the interior and then shut off when the driver enters the vehicle. In another use case, a person smokes cigarettes during a drive. The user than activates the air cleaner on exiting the vehicle and the air cleaner runs for a specified cycle to remove the odor of cigarettes from the interior of the car.

These and other aspects of the invention will be apparent from the following description and claims.

BRIEF DESCRIPTION OF DRAWINGS

Aspects of the invention are described below with reference to the following drawings in which like numerals reference like elements, and wherein.

DETAILED DESCRIPTION

It should be understood that aspects of the invention are described herein with reference to certain illustrative embodiments and the figures. The illustrative embodiments described herein are not necessarily intended to show all aspects of the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

Throughout this specification and in the claims, the term air treatment apparatus is intended to relate to an apparatus for sanitizing, filtering, decontaminating, deodorizing, purifying, cleaning, conditioning, heating, humidifying, drying and/or otherwise treating an atmosphere within a space.

Figure 1:
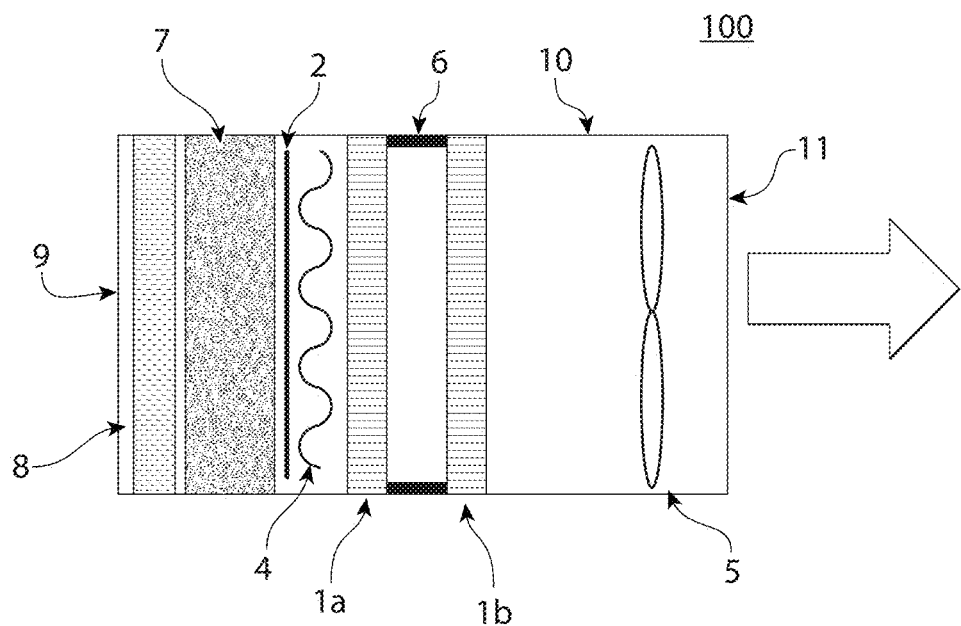
FIG. 1 shows a schematic view of an air treatment apparatus including an air mover to pull air through a housing.

FIG. 1 is a schematic view of an air treatment apparatus 100 including components that can be employed to achieve at least some objectives described herein. The apparatus 100 includes a housing 10 having an air inlet 9 to receive air into the housing 10 and an air outlet 11 to exhaust treated air. An air mover 5 such as a fan is arranged to move air along an air flow path in the housing 10 from the inlet 9 to the outlet 11 (e.g., in the direction of the arrow in FIG. 1). In this case, an optional prefilter 8 is arranged in the air flow path to remove relatively large material from the air flow and prevent its entering downstream areas of the apparatus 100. The prefilter 8 can be any suitable type of particulate filter, such as a grease filter or other. Downstream of the prefilter 8 is a controller 7 which can include any suitable hardware, software and other components to perform various component control and other functions described herein. Downstream of the controller 7 is a radiation shield 2 and a heater 4, and downstream of the heater 4 are one or more catalyst layers 1, e.g., formed of a plurality of catalyst sheets which each may have one or more formulations and/or structures depending on the desired performance of the air treatment apparatus. A first set of catalyst layers 1 may be oxidizing and/or adsorbing catalysts that capture and break down chemical contaminants and extend across an air treatment zone in the housing 10. In some embodiments, each catalyst layer is spaced apart from an adjacent catalyst layer, such as by spacer elements 6. The resulting air space between adjacent catalyst layers 1 can act to allow or create a more mixed or turbulent air flow through the catalyst layers 1. This prevents or disrupts a linear air flow through the catalyst material, such as when the catalyst layers 1 have a matching honeycomb passageway configuration. In this case a fan or other air mover 5 is downstream of the catalyst layers 1, but can be arranged in other ways or locations, such as upstream of the heater 4.

As described in more detail below, the radiation shield 2 can be arranged along the air flow path and configured so that air flows around the radiation shield and toward the catalyst layers 1. This feature may disrupt or otherwise help prevent laminar or linear flow through the catalyst layers 1 and/or shield the heater 4 from air flowing along the air flow path. For example, the heater 4 can include an electrical resistance heating element which generates radiant energy (e.g., including infrared radiation) and/or convective heat when supplied with electrical energy. The inventors have found that if such a heating element is exposed to air flowing along the air flow path, the heating element can be cooled so as to reduce radiant heat energy emitted by the heating element. By shielding the heating element from air flow along the air flow path, e.g., so as to avoid direct impingement of air flowing in the air path direction onto the heating element, the heating element can be allowed to reach a higher surface or other temperature and so emit more or more suitably arranged radiant energy. Since the heating element is spaced away from the catalyst layers 1, improved radiant energy emission by the heater can provide improved heating of the catalyst layers 1, particularly by way of radiant energy, and thus provide improved desorption, oxidation and/or other activity by the catalyst layers 1. Higher radiant energy heating can also help provide a sequential heating function to the catalyst layers where an upstream catalyst layer 1a is elevated in temperature before a downstream layer 1b. This arrangement can establish a temperature gradient across the catalyst layers 1 such that upstream layers 1 operate at a higher temperature than downstream layers 1, at least during a portion of an operation cycle. By having upstream catalyst layers heated to a higher temperature than downstream layers, contaminants desorbed or otherwise released from an upstream catalyst layer can be adsorbed, oxidized or otherwise acted on by a downstream catalyst layer, thereby helping to prevent contaminants from escaping the housing 10 to be released in a surrounding environment. Such sequential heating can be provided for arrangements having three or more catalyst layers, and can heat the layers such that, at least during some portion of time during operation, an upstream-most layer will be at a highest temperature and the temperature of catalyst layers will decrease from upstream to downstream with a downstream-most layer being at a lowest temperature. This type of sequential heating can be effective during a self-cleaning and/or regeneration operation mode where catalyst layers are cleaned of contaminants, e.g., so the catalyst layers can regain or maintain a desired level of effectiveness in adsorbing and/or oxidizing contaminants.

In addition to shielding a heating element from air flowing along the air flow path in the housing, the radiation shield 2 can also reflect or otherwise direct radiated heat from the heater 4 toward the catalyst layers 1. For example, the heater 4 may emit radiative heat energy in multiple directions, including in directions toward and away from the catalyst layers 1. For at least some energy directed away from the catalyst layers 1, the radiation shield 2 can absorb and re-emit and/or reflect radiated heat toward the catalyst layers 1, thereby improving the heating of the catalyst layers by infrared or other radiant heat energy. In some cases, the radiation shield can have a concave shape that defines a concave space and that faces toward the catalyst layers 1. The heater, e.g., a rod-shaped heating element, can be positioned in the concave space so that radiated heat energy emitted away from the catalyst layers can be directed by the radiation shield 2 toward to the catalyst layers 1. Positioning the heater 4 in a concave space that faces toward the catalyst layers (and away from an air flow direction along the air flow path) can help shield the heater 4 from air flow as well as help direct radiated heat toward the catalyst layers.

Figure 2:
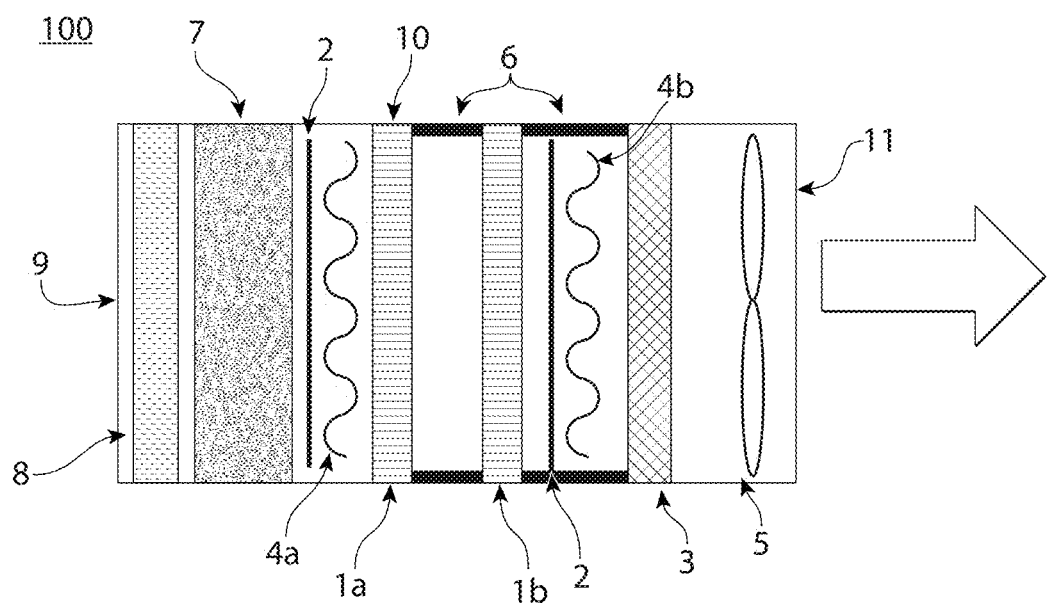
FIG. 2 shows a schematic view of an air treatment apparatus including multiple heaters and radiation shields.

FIG. 2 is a schematic of an air treatment apparatus 100 that is similar to FIG. 1, but includes a few modifications intended to illustrate how embodiments can be varied yet still incorporate inventive features. In FIG. 2, a second heater 4b is added between the catalyst layers 1b and 3 so that a temperature profile across the catalyst layers can be better controlled. Also, a third catalyst layer 3 is downstream of the first and second catalyst layers 1a, 1b. The further catalyst layer 3 can include a same catalyst material as the layers 1a, 1b, or a different catalyst material. The first or second catalyst layers 1a, 1b may contain more material to adsorb contaminants than the third catalyst layer 3, which may preferentially oxidize contaminants at a different temperature (e.g., lower) than catalyst layers 1a, 1b. The heaters 4a, 4b can be controlled to elevate the catalyst temperatures in a manner that cleans the catalyst layers 1a, 1b, 3 sequentially from upstream to downstream in the device, e.g., so the first catalyst layer 1a is elevated in temperature before the second and third layers 1b, 3, and so the second catalyst layer 1b is elevated in temperature before the third layer 3. Both heaters 4a, 4b can include a radiation shield 2, or only one of the heaters 4a or 4b can have a radiation shield 2.

Figure 3:
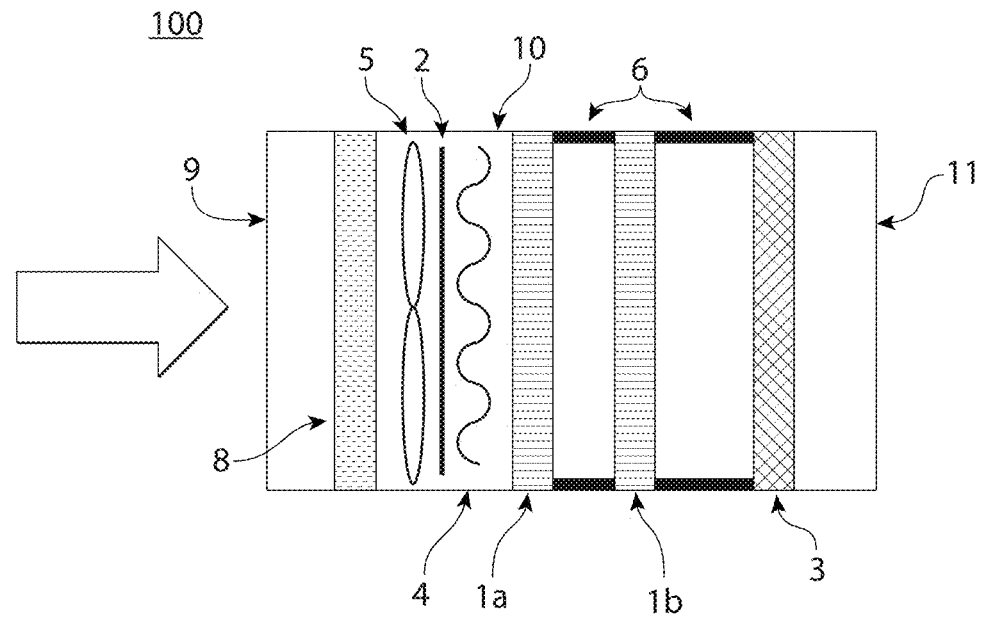
FIG. 3 shows a schematic view of an air treatment apparatus including an air mover to push air through a plurality of catalyst layers.

FIG. 3 is a schematic of another air treatment apparatus 100 that is similar to those in FIGS. 1 and 2, but which has an air mover 5 positioned upstream of the radiation shield 2 and heater 4 to push air flow through the housing 10 rather than pull the flow through the housing 10 as in FIGS. 1 and 2. This arrangement for the air mover 5 in FIG. 3 can help to exhaust air more slowly and evenly, e.g., so exhausted air does not blow noticeably on a person standing close to the apparatus outlet 11.

Figure 4:
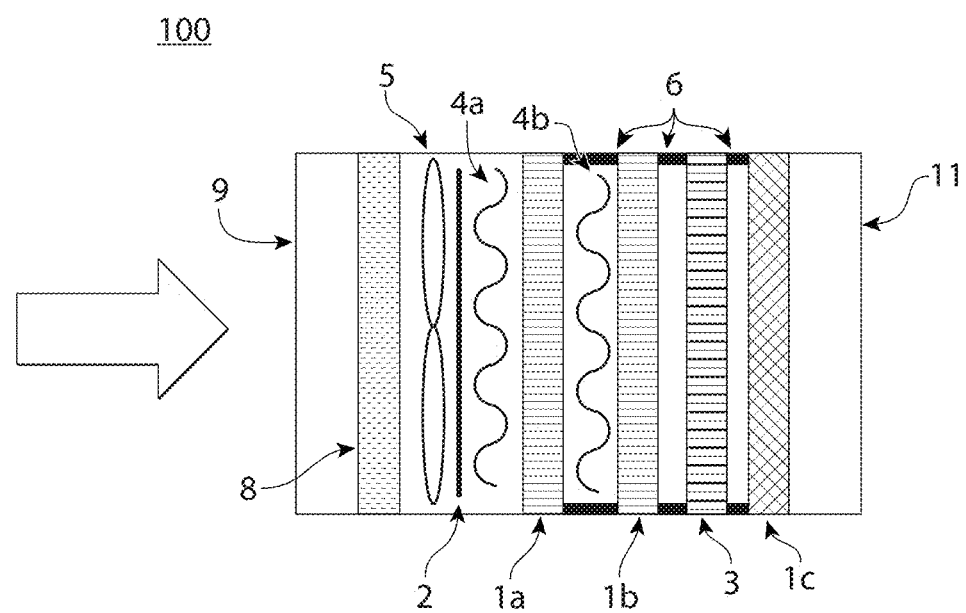
FIG. 4 shows a schematic view of an air treatment apparatus including a heater positioned between catalyst layers.

FIG. 4 is a schematic of another air treatment apparatus 100 with multiple layers of catalyst 1a, 1b, 1c, 3, multiple heaters 4a, 4b and a fan 5 that pushes the flow through the housing 10. In this embodiment, the second heater 4b does not include a radiation shield 2, but such a shield 2 could be included. Also, the radiation shield 2 for the first heater 4a can be eliminated.

Figure 5:
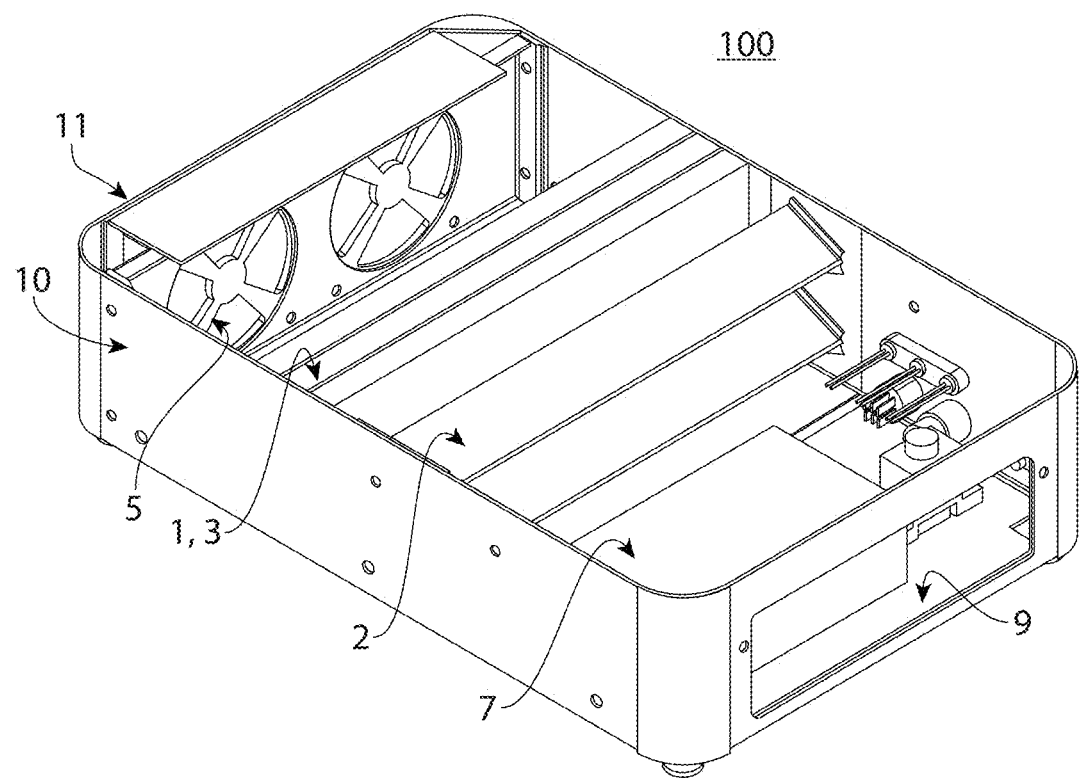
FIG. 5 shows a perspective view of an air treatment apparatus housing in an embodiment including V-shaped radiation shields.

FIG. 5 shows a front left perspective view of a housing 10 for an air treatment apparatus for an automobile, building room or other space. A portion of the housing 10 is removed, revealing fans 5 or other air movers that pull air through the housing 10 from an air inlet 9 to an air outlet 11, a plurality of spaced apart catalyst layers 1, 3, a heater 4, a radiation shield 2, and a controller 7. The apparatus 100 of FIG. 5 is arranged conceptually in a way similar to that in FIG. 1. The radiation shield 2, heater 4 and catalyst layers 1, 3 can extend across the housing 10 in a direction transverse (e.g., perpendicular) to a direction of flow through the housing 10 from the inlet 9 to the outlet 11.

Figure 6:
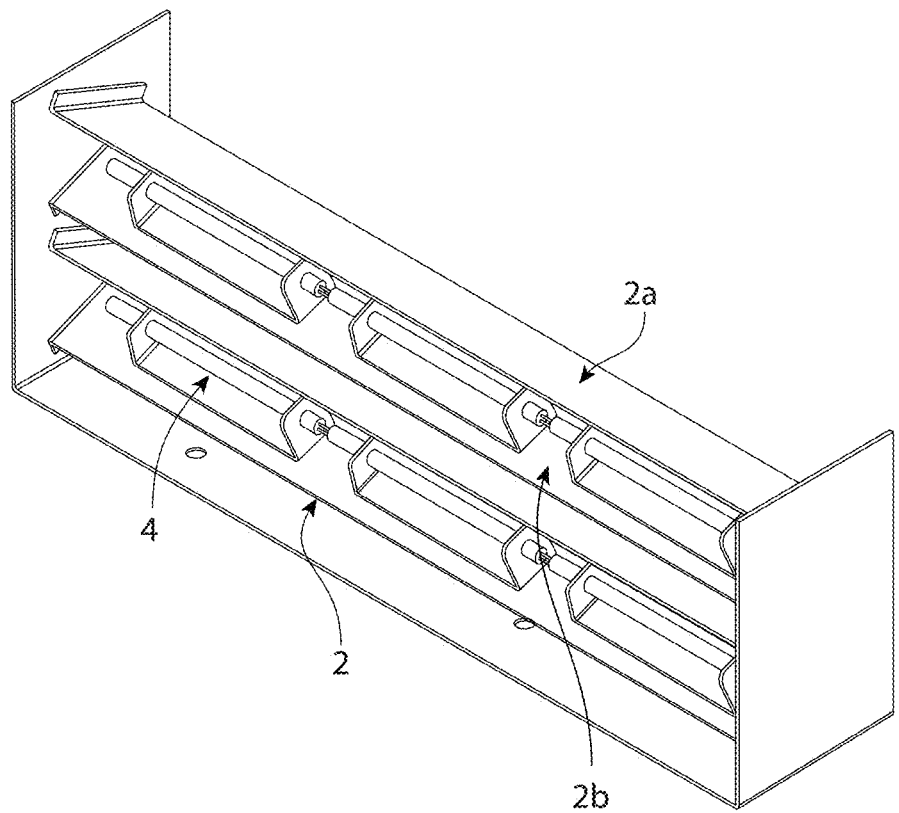
FIG. 6 shows a perspective view of a heater and radiation shield arrangement for the FIG. 5 embodiment.

FIG. 6 shows a rear left perspective view of the radiation shield 2 and heater 4 of the FIG. 5 embodiment. FIG. 6 illustrates how the heater 4, which includes multiple heating elements, is arranged to face toward the catalyst layers 1, 3 so the heater 4 can emit radiate heat directly toward the layers 1, 3. Also, the radiation shield 2 defines a concave space, e.g., a V-shaped cavity, that faces toward the catalyst layers 1 and in which the heating elements are located. This allows the radiation shield 2 to shield the heating elements from air flow along the air flow path and to direct radiated heat toward the catalyst layers 1, 3. In this embodiment, the radiation shield 2 includes two pairs of upper and lower panels 2a, 2b that each have an upstream edge and a downstream edge. The upstream edges of the upper and lower panels 2a, 2b are adjacent each other and the downstream edges of the upper and lower panels 2a, 2b are spaced apart, e.g., to define a V-shape when viewed from the side and in a direction perpendicular to the air flow along the air flow path. The internal surfaces of the panels 2a, 2b can reflect radiated heat from the heating elements toward the catalyst layers 1, 3, and the shape and/or angle of the panels 2a, 2b can be arranged to direct heat in a desired way toward the layers 1, 3. For example, in this embodiment the heating elements have an elongated rod shape with a longitudinal axis extending transverse (e.g., perpendicular) to the air flow path. An upper panel 2a extends along the longitudinal axis above each heating element, and a lower panel 2b extends along the longitudinal axis below each heating element. Since the upstream edges of the panels 2a, 2b are adjacent each other and downstream edges are spaced apart, the panels 2a, 2b define a concave shape that at least partially surrounds the heating element and faces the catalyst layers 1, 3. This arrangement of the upper and lower panels helps direct air moving along the air flow path over the upper panel and below the lower panel, and away from directly impinging on the heating elements. In this embodiment, the radiation shield 2 defines two laterally arranged concave spaces, e.g., each having a V-shape, in which heating elements are arranged, but other arrangements are possible. For example, the concave spaces could have a parabolic or otherwise curved shape. Also, the two pairs of panels 2a, 2b are arranged to provide an air flow gap between the upper pair of panels 2a, 2b and the lower pair of panels 2a, 2b. This air flow gap could be eliminated, e.g., with the downstream edges of the lower panel 2b of the upper pair and the upper panel 2a of the lower pair being adjacent each other.

As noted above, the controller 7 can control the operation of the air mover 5, heater 4 and/or other components to perform various functions, such as operating the apparatus 100 in two or more operation modes. As an example, the controller can be arranged to control operation of the air mover and the heater to operate in an air cleaning mode and a self-cleaning mode. In the air cleaning mode, the air mover is controlled to move air along the air flow path at a first flow rate, e.g., from the air inlet 9 to the air outlet 11. Also, the heater 4 is deactivated so the catalyst layers 1, 3 are not heated. This allows the catalyst layers 1, 3 to operate at a room or ambient temperature to adsorb and/or oxidize contaminants in air passing through the housing 10. In the self-cleaning mode, the air mover is controlled to move air along the air flow path at a second flow rate that is lower than the first flow rate and the heater is activated to radiate heat toward the plurality of catalyst layers 1, 3. As an example, while the catalyst layers may be at ambient temperature during the air cleaning mode, and the catalyst layers can be between 300 to 400 degrees F. during the self-cleaning mode. Also, during the self-cleaning mode, the controller 7 can control the heater 4 to heat the catalyst layers 1, 3 sequentially from upstream to downstream such that a first or upstream catalyst layer is elevated in temperature before a second or downstream catalyst layer. The catalyst layers can be arranged to desorb and oxidize contaminants at a higher rate at a higher temperature. Thus, sequential heating of the catalyst layers can cause upstream catalyst layers to be cleaned first, i.e., to desorb, oxidize and in some cases release contaminants, before downstream layers. However, any contaminants released by upstream layers during cleaning can be captured, adsorbed and/or oxidized by cooler downstream layers, helping to prevent escape of the contaminants from the housing 10. In this embodiment, the air treatment apparatus is free of any UV light emitter or ozone generator, and yet can still remove, neutralize or otherwise treat contaminants in air passing through the housing 10.

Figure 7:
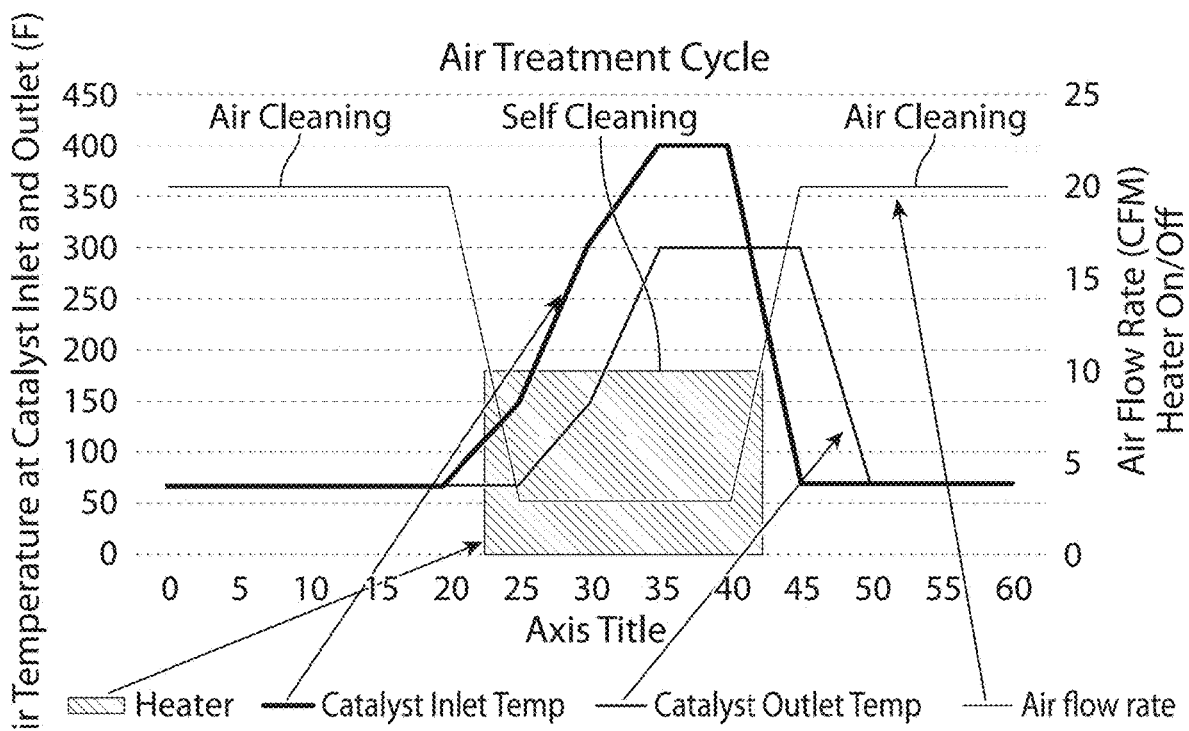
FIG. 7 shows an operating cycle for an air treatment method or apparatus including air cleaning and self-cleaning modes.

FIG. 7 shows an operating cycle of the air treatment apparatus that includes an air cleaning mode, a self cleaning mode and a return to the air cleaning mode. In this example, the catalyst layers are at ambient temperature during the air cleaning mode as illustrated by the catalyst inlet and outlet temperatures being at about 70 degrees F. However, during the self-cleaning mode the heater is operated and the catalyst inlet reaches about 400 degrees F. and the catalyst outlet reaches about 300 degrees F. That is, a temperature gradient is present across the plurality of catalyst layers such that upstream layers are operating at a higher temperature than downstream layers. The air flow through the housing drops from about 20 cubic feet per minute (CFM) in the air cleaning mode to about 3 CFM during the self-cleaning mode.

Figure 8:
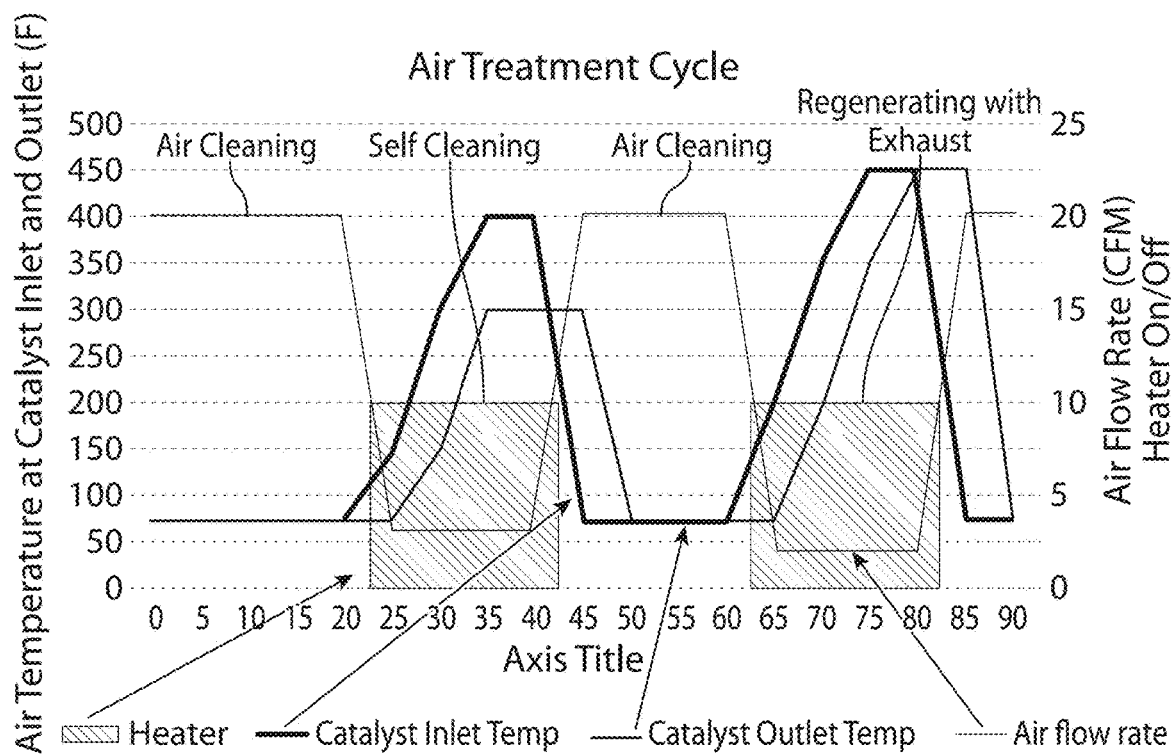
FIG. 8 shows an operating cycle for the air treatment method or apparatus including air cleaning, self-cleaning and regeneration modes.

FIG. 8 illustrates an operating cycle that includes an air cleaning mode, a self-cleaning mode, a second air cleaning mode and a regeneration mode. The air cleaning and self-cleaning modes are arranged in approximately the same way as in FIG. 7. The regeneration mode is arranged to increase the catalyst inlet and outlet temperatures to about 450 degrees F. and so that the catalyst inlet and outlet temperatures are equal at about 450 degrees F. for at least a period of time. Also, the air flow rate during the regeneration mode is lower than for the air cleaning and self-cleaning modes.

Figure 9:
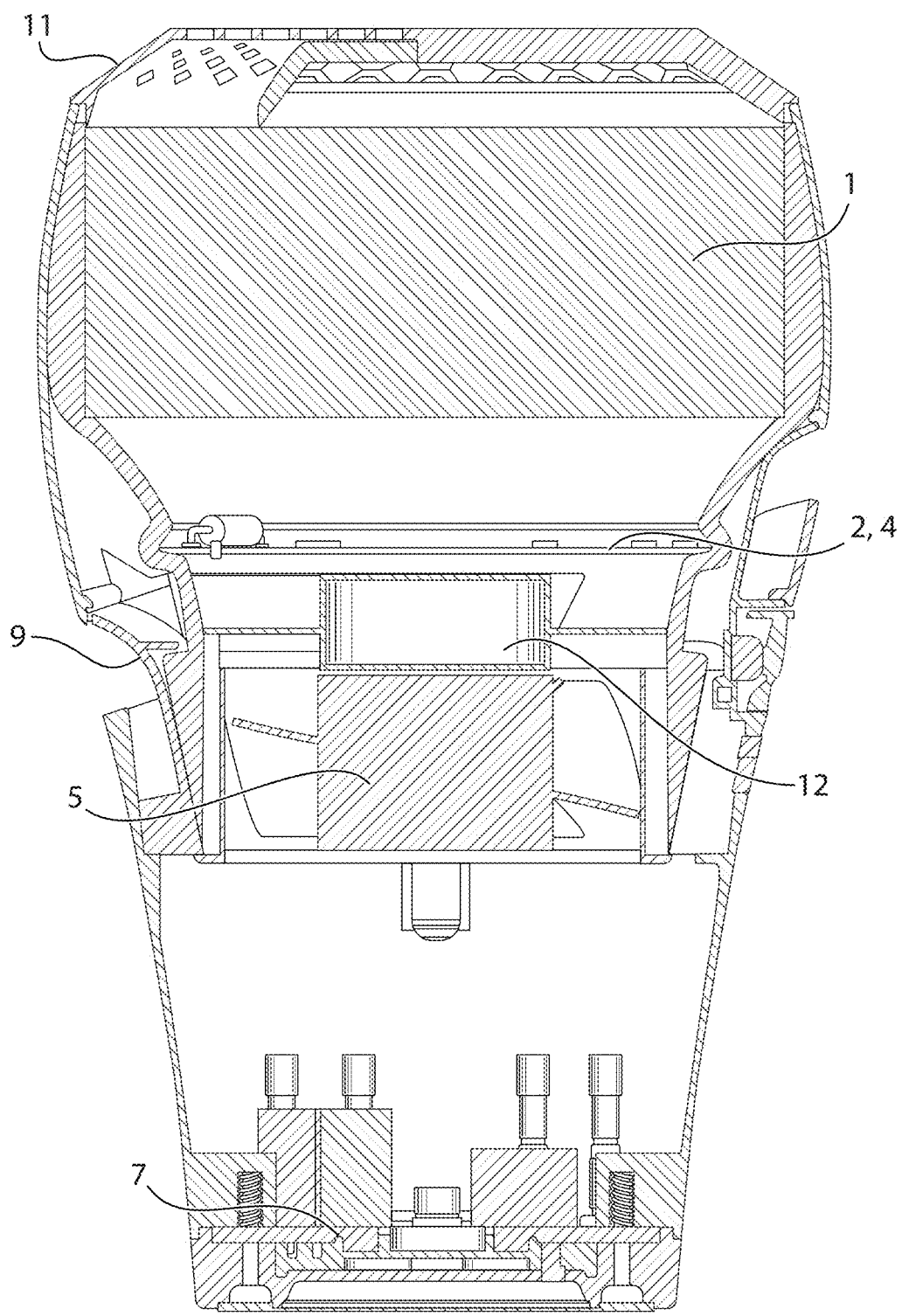
FIG. 9 shows a cross sectional view of an air treatment apparatus configured to be received in a cup holder.
Figure 10:
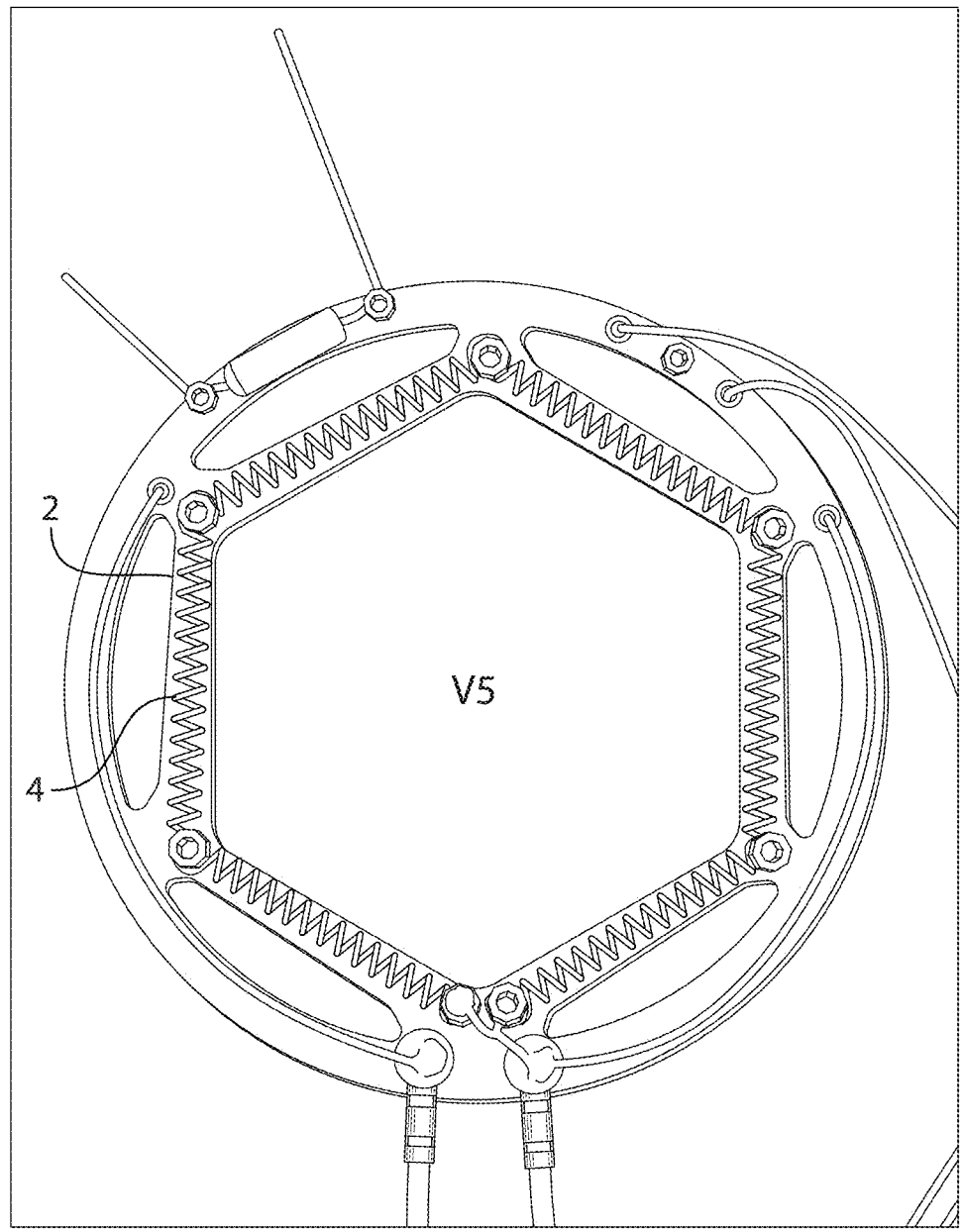
FIG. 10 is a top view of a radiation shield and heater arrangement for the FIG. 9 embodiment.

FIG. 9 shows a cross sectional view of an air treatment apparatus in another illustrative embodiment. In some cases, the apparatus is arranged to fit in a cup holder, e.g., of an automobile, to treat air in a space near the cup holder. The housing 10 includes an air inlet 9 at a generally cylindrical sidewall between a bottom and top of the housing 10, and an air outlet 11 at a top of the housing 10. Air is pulled into the inlet 9 by an air mover 5 such as a fan and is directed toward a radiation shield 2 and heater 4 positioned below one or more layers of catalyst material 1. Air flow from the air mover 5 can be directed through a flow straightener 12 or other element that arranges air flow in a desired way with respect to the radiation shield 2, heater 4 and/or catalyst layers 1. As in embodiments above, the radiation shield 2 is positioned upstream of the heater 4, e.g., to shield the heater 4 from air flow along the air flow path in the housing 10 local to the heater 4 and to reflect or otherwise direct radiated heat from the heater toward the catalyst layer(s) 1. FIG. 10 shows a top view of the radiation shield 2 and heater 4 in the FIG. 9 apparatus and illustrates how heating elements (wire coils positioned over segments of the shield 2 that define a hexagonal shape) are positioned so that air flow passing around the portions of the shield 2 does not directly impinge on the heating elements. In addition, portions of the shield 2 below each heating element are arranged to reflect or otherwise direct radiated heat upwardly (in a direction out of the page of FIG. 10) toward the catalyst layers 1.

It is to be understood that the disclosed subject matter is not limited in its application to the details of construction and to the arrangements of the components set forth in the description or illustrated in the drawings. The disclosed subject matter is capable of other embodiments and of being practiced and carried out in various ways. Also, it is to be understood that the phraseology and terminology employed herein are for the purpose of illustration and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

For example, the term "air" is used in general in this document and it can be interpreted to include both natural air and/or any gaseous or vaporous matter.

Operation of the apparatus components may be controlled by the controller, which may include a programmed processor and/or other data processing device along with suitable software or other operating instructions, one or more memories (including non-transient storage media that may store software and/or other operating instructions), temperature and other sensors, pressure sensors, input/output interfaces (such as a user interface on the housing), communication buses or other links, a display, switches, relays, triacs, or other components necessary to perform desired input/output or other functions. A user interface may be arranged in any suitable way and include any suitable components to provide information to a user and/or receive information from a user, such as buttons, a touch screen, a voice command module (including a microphone to receive audio information from a user and suitable software to interpret the audio information as a voice command), a visual display, one or more indicator lights, a speaker, and so on.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. An air treatment apparatus comprising:
a housing having an air inlet and an air outlet;
an air mover arranged to move air along an air flow path in the housing from the air inlet to the air outlet;
a plurality of catalyst layers including a first catalyst layer and a second catalyst layer, the plurality of catalyst layers arranged in the air flow path such that air moves along the air flow path from the first catalyst layer to the second catalyst layer downstream of the first catalyst layer, the plurality of catalyst layers each being arranged to adsorb and oxidize contaminants;
a heater including a heating element positioned along the air flow path upstream of the plurality of catalyst layers to heat the plurality of catalyst layers, the heater being spaced from the plurality of catalyst layers and positioned, constructed and arranged to emit radiated heat at least some of which travels along a straight line path directly from the heater to the first catalyst layer; and
a radiation shield positioned along the air flow path upstream of the heating element and constructed and arranged in the air flow path such that air flows around the radiation shield and toward the plurality of catalyst layers, the radiation shield being arranged to reflect at least some of the radiated heat from the heating element to be incident on the first catalyst layer,
wherein the air treatment apparatus is free of any structure between the heater and the first catalyst layer along the straight line path.

2. The air treatment apparatus of claim 1, wherein the radiation shield and the heating element are arranged such that the heating element is shielded by the radiation shield from air moving along the air flow path.

3. The air treatment apparatus of claim 1, wherein the heating element is arranged to radiate heat toward the plurality of catalyst layers.

4. The air treatment apparatus of claim 1, wherein the radiation shield has a concave shape that defines a concave space in which the heating element is positioned and that faces the plurality of catalyst layers.

5. The air treatment apparatus of claim 4, wherein the radiation shield has upper and lower panels each have an upstream edge and a downstream edge, and the upstream edges of the upper and lower panels are adjacent each other and the downstream edges of the upper and lower panels are spaced apart.

6. The air treatment apparatus of claim 4, wherein the heating element is positioned in the concave space such that the heating element is shielded by the radiation shield from air moving along the air flow path.

7. The air treatment apparatus of claim 1, wherein the heating element has an elongated rod shape with a longitudinal axis extending transverse to the air flow path.

8. The air treatment apparatus of claim 7, wherein the radiation shield includes an upper panel that extends along the longitudinal axis above the heating element, and a lower panel that extends along the longitudinal axis below the heating element, the upper and lower panels having upstream edges that are adjacent each other and downstream edges that are spaced apart so as to define a concave shape.

9. The air treatment apparatus of claim 8, wherein the upper and lower panels are arranged such that air moving along the air flow path is directed over the upper panel and below the lower panel.

10. The air treatment apparatus of claim 1, further comprising a controller arranged to control operation of the air mover and the heater to operate in an air cleaning mode and a self-cleaning mode, the air cleaning mode including operation of the air mover to move air along the air flow path at a first flow rate and deactivation of the heater, and the self-cleaning mode including operation of the air mover to move air along the air flow path at a second flow rate that is lower than the first flow rate and activation of the heater to radiate heat toward the plurality of catalyst layers.

11. The air treatment apparatus of claim 10, wherein the plurality of catalyst layers is at ambient temperature during the air cleaning mode, and the plurality of catalyst layers are between 300 to 400 degrees F. during the self-cleaning mode.

12. The air treatment apparatus of claim 1, wherein the heater is arranged to heat the plurality of catalyst layers sequentially from upstream to downstream such that the first catalyst layer is elevated in temperature before the second catalyst layer.

13. The air treatment apparatus of claim 1, wherein the air treatment apparatus is free of any UV light emitter or ozone generator.

14. The air treatment apparatus of claim 1, wherein the plurality of catalyst layers is arranged to desorb and oxidize contaminants at a higher rate at a higher temperature.

15. The air treatment apparatus of claim 1, wherein the radiation shield has a concave shape that faces in a downstream direction in relation to the air flow path and defines a concave space in which the heating element is positioned.

16. The air treatment apparatus of claim 1, wherein the radiation shield is constructed and arranged to reflect at least some of the radiated heat from the heating element to travel along a reflected path that extends from the radiation shield to the first catalyst layer, wherein the air treatment apparatus is free of any structure between the radiation shield and the first catalyst layer along the reflected path.

17. The air treatment apparatus of claim 1, further comprising a controller arranged to control operation of the air mover and the heater to operate such that the heater emits radiated heat during a same time that the air mover moves air along the air flow path.

* * * * *